United States Patent [19]

Song et al.

[11] Patent Number: 5,545,364
[45] Date of Patent: Aug. 13, 1996

[54] PROCESS FOR THE PREPARATION OF HEAT RESISTANT POLYESTER FILM

[75] Inventors: Il-Cheon Song, Kunpo-si; Sang-Il Kim, Suwon-si; Young-Jin Lee, Anyang-si, all of Rep. of Korea

[73] Assignee: SKC, Limited, Kyungki-do, Rep. of Korea

[21] Appl. No.: 539,282

[22] Filed: Oct. 4, 1995

[30] Foreign Application Priority Data

Oct. 6, 1994 [KR] Rep. of Korea ............. 94-25498
Oct. 6, 1994 [KR] Rep. of Korea ............. 94-25499

[51] Int. Cl.$^6$ ............................................. D01D 5/12
[52] U.S. Cl. ............. 264/210.5; 528/272; 528/302; 528/308; 528/308.6; 528/481; 528/502 C; 528/503; 264/176.1; 264/177.17; 264/177.19; 264/211.11
[58] Field of Search ......................... 528/272, 302, 528/308, 308.6, 481, 502, 503; 264/176.1, 177.17, 177.19, 210.5, 211.11

[56] References Cited

U.S. PATENT DOCUMENTS

| | | | |
|---|---|---|---|
| 3,627,579 | 12/1971 | Heffelfinger | 428/356 |
| 4,390,683 | 6/1983 | Yatsu et al. | 528/194 |
| 4,677,188 | 6/1987 | Utsumi et al. | 528/272 |
| 4,720,412 | 1/1988 | Katoh et al. | 428/141 |
| 4,963,418 | 10/1990 | Isaka et al. | 428/34.9 |
| 4,985,538 | 1/1991 | Fukuda et al. | 528/305 |
| 5,153,302 | 10/1992 | Masuda et al. | 528/272 |
| 5,439,961 | 8/1995 | Itol et al. | 524/167 |

*Primary Examiner*—Samuel A. Acquah
*Attorney, Agent, or Firm*—Anderson Kill Olick & Oshinsky, P.C.

[57] ABSTRACT

A polyester film having excellent heat resistance and insulation property is produced by the inventive process which comprises: melt-extruding a polyester resin into a sheet, extending the sheet to shape it into a film and treating the film thermally to heat-set, wherein the polyester resin has an intrinsic viscosity of 0.7 to 0.75 dl/g and other portions which satisfy formula (1) and the thermal treatment is carried out so that formula (2) is satisfied:

$$[COOH]/[IV]<50 \quad (1)$$

$$1.0<S/D<1.2 \quad (2)$$

wherein:

[COOH] represents the content (meq/$10^6$) of terminal carboxyl groups in the polyester resin;

[IV] represents the intrinsic viscosity (dl/g) of the polyester resin;

S represents the X-ray crystal size (Å) of the heat-set polyester film; and

D represents the degree of crystallinity (%) of the heat-set polyester film.

5 Claims, No Drawings

PROCESS FOR THE PREPARATION OF HEAT RESISTANT POLYESTER FILM

FIELD OF THE INVENTION

The present invention relates to a process for the preparation of a heat resistant polyester film having a low oligomer content, by way of controlling the terminal carboxyl group content and the intrinsic viscosity of a polyester resin during melt-extrusion as well as the crystal size and the degree of crystallinity of a biaxially oriented film during the heat treatment within specified ranges.

BACKGROUND OF THE INVENTION

In general, polyesters such as polyethylene terephthalates (PET) possess good mechanical, thermal, chemical and electrical properties. Therefore, they have been widely used in preparing magnetic tapes, photographic films, capacitors, electrical insulating materials, wrapping materials, industrial mold products and others.

However, polyesters usually do not have sufficiently high heat resistance for certain electrical application, and they also contain about 2.0 to 2.5 wt % of trouble-causing low molecular weight materials, e.g., a conventional PET resin contains a cyclic trimer and oligomers composed of 3 and 4 to 10 ethylene terephthalate units, respectively, dialkyl terephthalate and unreacted starting materials.

For example, when such polyesters are used as insulating materials in an air-tight chamber such as a freezer, the cyclic trimer and oligomers present in the polyester film may be leached out into the refrigerant, thereby blocking nozzles of the freezer motor and contaminating the refrigerant. Further, when such polyesters are used in magnetic media, the cyclic trimer and oligomers may accumulate on the surface as white powdery deposits or protrusions during the high-temperature processes of calendering and applying a magnetic layer, thereby lowering the performance quality of the final film product, e.g., poor appearance, runnability, wearability, etc. Furthermore, in an injection molding process, the trimer and oligomers may contaminate the mold.

Accordingly, it is desirable to prepare a polyester resin with a reduced content of low molecular weight materials, particularly the cyclic trimer and oligomers, preferably to below 1.0 wt % by weight. However, it is very difficult to reduce their content to such a low level because they are always present in a fixed equilibrium amounts relating to the polyester portion.

Numerous attempts have been made to remove such low molecular weight materials and methods based on extracting the low molecular weight materials using various solvents have been used most frequently.

Japanese Patent Publication No. 23348/1968 discloses a method of removing low molecular weight materials from a polyester film by dipping the film into a heated dimethylformamide solution to extract the low molecular weight materials out from the film, and similarly, Japanese Patent Publication No. 2120/1969 describes a method which comprises dipping a linear polyester film in a heated solution of benzyl alcohol until the content of the low molecular weight materials in the film becomes about 1% by weight or less, and then removing the benzyl alcohol solution containing the low molecular weight materials.

Such extraction methods may be effective in reducing the content of low molecular weight materials when an appropriate solvent is employed. However, they have several disadvantages, e.g., additional solvent-handling steps are required, leading to an increased production cost. Moreover, the properties of the polyester film may deteriorate by the action of the solvent used.

Further, Japanese Patent Publication No. 41327/1984 teaches a method of preventing the generation of such oligomers by adding an end-group-blocking agent during the polymerization step. However, this method has a difficulty in controlling the intrinsic viscosity of the polymer, which may cause decreased productivity as well as poor heat resistance of the finished product.

Japanese Patent Laid-open Publication No. 296860/1990 discloses a method of enhancing the heat resistance of a polyester film by controlling the amount of inorganic particles contained in the resin and the speed of crystallization during the film preparation process. This method has a disadvantage in that an excess amount of stabilizer is required in the polymerizing reaction, causing a longer polymerization cycle time, and hence, low productivity.

Japanese Patent Laid-open Publication No. 263937/1992 describes a method of coating the surface of a polyester film with a layer composed of a mixture of polyester and polyacrylic resins. The polyester film prepared by this method is coated on both surfaces thereof, thereby increasing the production cost, and creating the problem that the coating layer may be abraded after a prolonged use as an insulating film.

SUMMARY OF THE INVENTION

It is, therefore, an object of the present invention to provide a process for preparing a polyester film with a reduced content of a cyclic trimer and oligomers, which possesses excellent heat resistance and electrical insulation properties.

In accordance with an aspect of the present invention, there is provided a process for preparing a polyester film which comprises melt-extruding and extending a polyester resin to shape it into a film and treating the film thermally to heat-set wherein the polyester resin has an intrinsic viscosity of 0.7 to 0.75 dl/g, the melt-extrusion is carried out using a polyester resin which satisfies formula (1), and the thermal treatment is carried out so that formula (2) is satisfied:

$$[COOH]/[IV] < 50 \quad (1)$$

$$1.0 < S/D < 1.2 \quad (2)$$

wherein:

[COOH] represents the content (meq/$10^6$) of terminal carboxyl groups in the polyester resin;

[IV] represents the intrinsic viscosity (dl/g) of the polyester resin;

S represents the X-ray crystal size (Å) of the heat-set polyester film; and

D represents the degree of crystallinity (%) of the heat-set polyester film.

In accordance with a preferred aspect of the present invention, the polyester-resin is prepared by solid phase polymerization of a molten polyester composite, having an intrinsic viscosity of 0.5 to 0.6 dl/g and comprising 70% by weight of repeating ethylene terephthalate unit, so that the resultant polyester resin satisfies formula (3):

$$2.9 < [IV] \times 10/PDI < 3.2 \quad (3)$$

wherein:

[IV] represents the intrinsic viscosity of the polyester resin; and

PDI represents the molecular weight distribution, calculated as the ratio of the weight average molecular weight to the number average molecular weight of the polyester resin (Mw/Mn).

DETAILED DESCRIPTION OF THE INVENTION

The term "cyclic trimer" used herein refers to a cyclic compound composed of three repeating units and the term "oligomer" refers to a compound composed of 4 to 10 repeating units.

A polyester film is typically prepared by polymerizing reaction monomers to provide a polyester resin, melt-extruding and extending the polyester resin to shape it into a film, and treating the film thermally for heat-setting.

In accordance with the present invention, there is provided a polyester film having an excellent heat resistance and electrical insulation property, by way of controlling the terminal carboxyl group content and the intrinsic viscosity of a resin during the melt-extrusion process as well as the crystal size and the degree of crystallinity of a biaxially oriented film during the heat treatment process within a specified ranges defined in the present invention.

A polyester resin suitable for use in the present invention may be prepared by polycondensation of an acid component, such as a dialkyl ester of an aromatic dicarboxylic acid with a diol component, such as an alkylene glycol.

Representatives of the dialkyl ester of aromatic dicarboxylic acid include: dialkyl esters of terephthalic acid, isophthalic acid, naphthalene dicarboxylic acid, cyclohexane dicarboxylic acid, diphenoxyethane dicarboxylic acid, diphenyl dicarboxylic acid, diphenylether dicarboxylic acid, anthracene dicarboxylic acid and $\alpha,\beta$-bis(2-chlorophenoxy)ethane- 4,4'-dicarboxylic acid; and, among these, dimethyl terephthalate is most preferred.

Exemplary alkylene glycol are ethylene glycol, trimethylene glycol, tetramethylene glycol, pentamethylene glycol, hexamethylene glycol and hexylene glycol. Among these, ethylene glycol is most preferred.

The polyester resin useful for the present invention preferably comprises 70% by weight or more of polyethylene terephthalate and 30% or less of copolyesters. Copolymerizable monomers which may be used include: diols such as diethylene glycol, propylene glycol, neopentylene glycol, polyethylene glycol, p-xylene glycol, 1,4-cyclohexane dimethanol and sodium 5-sulfo-resorcin; dicarboxylic acid such as adipic acid, sodium 5-sulfo-isopthalate; and multifunctional dicarboxylic acids such as trimelitic acid and pyromelitic acid.

The polyester resin may be preferably prepared by solid phase polymerization of a polyester composite having an intrinsic viscosity of 0.5 to 0.6 dl/g and 70% by weight of ethylene terephthalate unit, so that the resultant polyester resin satisfies formula (3):

$$2.9<[IV]\times 10/PDI<3.2 \tag{3}$$

wherein:

[IV] represents the intrinsic viscosity of the polyester resin obtained; and

PDI represents the molecular weight distribution, calculated as the ratio of the weight average molecular weight to the number average molecular weight of the polyester resin (Mw/Mn).

The polyester polymer composite used for the preparation of a polyester resin may be prepared by polymerizing monomers via a melt-polymerization method.

The solid phase polymerization may be carried out at or below the melting point of the polymer composite, e.g., a temperature range of 180° to 250° C., preferably 200° to 230° C., under vacuum, e.g., 0.1 torr or less for a period ranging from 10 to 30 hours; and the resultant polyester resin, having an intrinsic viscosity of 0.7 to 0.75 dl/g, contains greatly reduced amount of the cyclic trimer and oligomers, the combined amount not exceeding 0.4% by weight.

If formula (3) is not met, the content of the cyclic trimer and oligomers is difficult to control, i.e., it increases.

The polyester resin of the present invention may comprise additives, e.g., antioxidant, UV absorbent, thermal stabilizer, crystallization accelerator, colorant, nucleating agent, lubricant, anti-blocking agent and the like, in amounts which would not deteriorate the effectiveness of the present invention.

Further, in order to impart good winding and optical properties to the film, the polyester resin may comprise additional inert inorganic or organic particles which are insoluble in the polyester resin. These inert particles may be employed in amounts which would not affect the effectiveness of the present invention.

Representatives of the inorganic particles include: oxides or other inorganic salts of a metal selected from Group II, III or IV of Periodic Table of Element, e.g., synthetic or natural calcium carbonate, wet or dry silica, calcium phosphate, magnesium carbonate, talc, alumina, sodium fluoride, titanium oxide, mica, aluminum hydroxide, calcium terephthalate and the like.

Organic particles suitable for use in the present invention include: particles of a crosslinked polymer, elastomer or fluorine-containing polymer; and, among these, particles of crosslinked polystyrene and fluorine-containing polymers are most preferred.

The inert particles may be added to the polyester resin at any time before terminating the polycondensation of raw materials, and they are preferably added immediately after the transesterification step, or at the beginning of the polycondensation step.

In accordance with the present invention, the polyester film of the present invention may be obtained as follows.

A polyester resin having the proportions which satisfy formula (1) is melt-extruded into an amorphous cast sheet by passing it through a T-die:

$$[COOH]/[IV]<50 \tag{1}$$

wherein:

[COOH] represents the content (meq/$10^6$) of terminal carboxyl groups in the polyester resin; and

[IV] represents the intrinsic viscosity (dl/g) of the polyester resin.

The melt-extrusion may be preferably conducted at a temperature ranging from Tm+20° C. to Tm+40° C., where Tm represents the melting point of the polyester resin.

If the formula (1) is not satisfied, the content of the cyclic trimer and oligomers increases and the heat resistance of the polyester film becomes deteriorated.

The sheet is then passed through rollers, which are maintained at a temperature ranging from $T_g$+10° to $T_g$+50° C., where $T_g$ is the glass transition temperature of the polyester resin, and are rotated at different speeds, to extend the resin in the longitudinal (film proceeding) direction in a draw ratio of 2.0 to 5.0, and then, cooled to room temperature, thus providing a monoaxially oriented film. The monoaxially oriented film is then transported to a tenter, where the film is extended in both longitudinal and traverse directions at a temperature ranging from $T_g'+10°$ to $T_g'+50°$ C., where $T_g'$ is the glass transition temperature of the monoaxially oriented polyester film, in a draw ratio of 3.0 to 5.0, thus providing a biaxially oriented polyester film.

The film so obtained is then subjected to a thermal treatment process, thereby to impart dimension stability to the film and to control its crystal structure, so that formula (2) is satisfied:

$$1.0 < S/D < 1.2 \quad (2)$$

wherein:

S represents the X-ray crystal size (Å) of the heat-treated film; and

D represents the degree of crystallinity (%) of the heat-treated film.

The thermal treatment may be preferably carried out at a temperature range of $Tm-80°$ C. to $Tm-20°$ C. During the thermal treatment process, the film is subjected to a relaxation treatment by partially releasing the tensional stress applied to the film when the temperature reaches $Tm-60°$ C. during the thermal treatment cycle.

When the S/D value is 1.2 or greater, the mechanical properties of the film becomes inferior, and when used for refrigerator applications, the oligomers are easily extracted by refrigerant. Further, when the S/D value is 1.0 or less, the dimensional and heat stabilities of the film become poor.

In preparing the polyester film in accordance with the present invention, conditions for melt-extrusion, casting, longitudinal and traverse direction extensions, heat-setting and winding may be suitably determined by persons skilled in the art.

The following Examples are intended to illustrate the present invention more specifically, without limiting the scope of the invention.

In Examples and Comparative Examples, the properties of the resin and the film were evaluated in accordance with the following methods.

1. Content of Terminal Group, [COOH]

The content of terminal —COOH group in a polyester resin was determined in accordance with the method described in *Makromol. Chem.*, 26, 226 (1958).

2. Intrinsic Viscosity, [IV]

The intrinsic viscosity of a polyester resin was determined at a sample concentration of 0.3 g per 25 ml of ortho-chlorophenol at 35° C.

3. Content of Oligomer

The oligomer content was determined using a HPLC apparatus (Varian Co., U.S.A.) as follows: 100 mg of a polyester film sample was dissolved in 1 ml of orthochlorophenol. The fraction containing oligomer was separated from the solution by HPLC using a mixture of trichloroacetic acid, chloroform, acetone and ammonium hydroxide as an eluent at a flow rate of 1.0 ml/min. This fraction was evaporated under a reduced pressure, and the separated oligomer was weighed. The content of oligomer was calculated as wt % of the initial weight of the sample.

4. Molecular Weight

The molecular weight of a polyester resin sample was measured by subjecting a 0.1 wt % sample solution in m-cresol to gel permeation chromatography (GPC).

5. X-ray Crystal Size, S

The average size of crystals in a polymer film was measured using an X-ray analyzer.

6. Degree of Crystallinity, D

The density of a film sample, determined by employing a density gradient column, was converted to the degree of crystallinity by the following equation:

$$\text{Degree of Crystallinity} = [C_d \times (C_d - S_d)] / [S_d \times (C_d - A_d)] \times 100$$

wherein, $C_d$ is the density of crystalline region in the polyester (1.455); $A_d$ is the density of non-crystalline region in the polyester (1.335); and $S_d$ is the measured density of the sample.

7. Heat Resistance

The heat resistance was evaluated using a tensile strength tester by measuring the time required for a film to reach 50% of the original elongation, and classified each film on the basis of the following criteria:

○, good: time required $\geq$ 300 hours

Δ, common: 100 hours $\leq$ time required < 300 hours

×, poor: time required < 100 hours

8. Melting Point of Polymer

The melting point (°C.) of a polyester resin was determined by using a differential scanning calorimeter (Perkin-Elmer, England) at a scanning speed of 20° C./min.

EXAMPLE 1

Dimethyl terephthalate and ethylene glycol were mixed in an equivalent ratio of 1:2, and transesterified in the presence of zinc acetate transesterification catalyst to form a polyethylene terephthalate monomer, i.e., bis-2-hydroxyethyl terephthalate. Antimony trioxide was then added as a polycondensation catalyst and the resultant mixture was polycondensed to obtain a polyester composite having an intrinsic viscosity of 0.60 dl/g. The composite was subjected to solid phase polymerization by heating at 200° C. for 20 hours under a vacuum of 0.1 torr or less, giving a polyester resin having an intrinsic viscosity of 0.75 dl/g and PDI- (polymer distribution index) of 2.4.

The measured properties of this polyester resin are shown in Table I.

COMPARATIVE EXAMPLE 1-1

The procedure of Example 1 was repeated except that a polyester composite having an intrinsic viscosity of 0.64 dl/g was used in the solid phase polymerization step to give a polyester resin having an intrinsic viscosity of 0.65 dl/g and PDI of 2.4.

The measured properties of this resin are shown in Table I.

COMPARATIVE EXAMPLE 1-2

The procedure of Example 1 was repeated except that a polyester composite having an intrinsic viscosity of 0.65 dl/g was subjected to solid phase polymerization by heating at 200 ° C. for 15 hours to give a polyester resin having an intrinsic viscosity of 0.75 dl/g and PDI of 2.25.

The measured properties of the resin are shown in Table I.

TABLE I

| | | Physical Properties of Polyester Resin | | |
|---|---|---|---|---|
| | | [IV] (dl/g) | PDI | [IV]*10/PDI | Oligomer Content (wt %) |
| Example 1 | | 0.75 | 2.4 | 3.13 | 0.33 |
| Comp. | 1-1 | 0.65 | 2.4 | 2.67 | 0.80 |
| Example | 1-2 | 0.75 | 2.25 | 3.33 | 0.60 |

EXAMPLE 2

Polyester having an intrinsic viscosity of 0.6 dl/g was subjected to solid phase polymerization by heating at 230° C. for 20 hours under a vacuum of 0.1 torr or less to give a polyester resin having an intrinsic viscosity of 0.70 dl/g. The resultant polyester resin was melt-extruded at 280° C. for 4 minutes to form a cast sheet. This sheet was extended in a draw ratio of 3.5 in the longitudinal direction at 90° C., and then, in the transverse direction at 130° C. to provide a biaxially oriented film. Then, the film was treated thermally, while carrying out a relaxation treatment when the temperature reached 240° C., to obtain a biaxially oriented film having a size of crystal of 55 Å and a degree of crystallinity of 50%.

The properties of the film were measured and the results are shown in Table II.

COMPARATIVE EXAMPLE 2-4

The procedure of Example 2 was repeated except that a polyester composite having an intrinsic viscosity of 0.7 dl/g was subjected to solid phase polymerization by heating at 230° C. for 30 hours to give a polyester resin having an intrinsic viscosity of 0.9 dl/g, which was employed to prepare a biaxially oriented polyester film having a crystal size of 45 Å and a degree of crystallinity of 60%.

The properties of the film were measured and the results are shown in Table II.

TABLE II

| | | Physical Properties of Polyester Resin | | | Physical Properties of Polyester Film | | | | |
|---|---|---|---|---|---|---|---|---|---|
| | | | | | Oligomer | | | | Heat |
| | | [IV] (dl/g) | [COOH] (meq/$10^6$) | [COOH]/ [IV] | Content (wt %) | S (Å) | D (%) | S/D | Resistance |
| Example 2 | | 0.70 | 25 | 35.7 | 1 | 55 | 50 | 1.1 | O |
| Comp. | 2-1 | 0.65 | 50 | 76.9 | 1.6 | 60 | 45 | 1.3 | Δ |
| Example | 2-2 | 0.70 | 25 | 41.6 | 1.5 | 50 | 55 | 0.9 | x |
| | 2-3 | 0.65 | 50 | 90.9 | 2 | 64 | 50 | 1.28 | x |
| | 2-4 | 0.90 | 30 | 42.8 | 1.1 | 45 | 60 | 0.75 | x |

COMPARATIVE EXAMPLE 2-1

The procedure of Example 2 was repeated except that the temperature and time of the melt extrusion process were varied, to obtain a cast polyester sheet having an intrinsic viscosity of 0.65 dl/g and terminal group content, [COOH], of 50 meq/$10^6$. The cast sheet was extended by the same manner as in Example 2, and the resultant film was treated thermally with varying the treatment condition to provide a biaxially oriented film having a crystal size of 60 Å and a degree of crystallinity of 45%.

The properties of the film were measured and the results are shown in Table II.

COMPARATIVE EXAMPLE 2-2

The procedure of Example 2 was repeated except that a polyester composite having an intrinsic viscosity of 0.6 dl/g was subjected to solid phase polymerization by heating at 200° C. for 20 hours to give a polyester resin having an intrinsic viscosity of 0.7 dl/g, which was employed to prepare a biaxially oriented polyester film having a crystal size of 50 Å and a degree of crystallinity of 55%.

The properties of the film were measured and the results are shown in Table II.

COMPARATIVE EXAMPLE 2-3

The procedure of Example 2 was repeated except that a polyester composite having an intrinsic viscosity of 0.55 dl/g was subjected to solid phase polymerization to give a polyester resin having an intrinsic viscosity of 0.65 dl/g, which was employed to prepare a biaxially oriented polyester film having a crystal size of 64 Å and a degree of crystallinity of 50%.

As can be seen from Examples and Comparative Examples, the film prepared by controlling the intrinsic viscosity, the terminal group content, [COOH], and the X-ray crystal size and the degree of crystallinity within given ranges has a lower oligomer content as well as good heat resistance.

The polyester film prepared from the inventive process is useful as wrapping materials, magnetic recording media, electric insulation materials, capacitors, graphic articles and the like.

While the invention has been described with respect to the specific embodiments, it should be recognized that various modifications and changes may be made by those skilled in the art to the invention which also fall within the scope of the invention as defined by the appended claims.

What is claimed is:

1. A process for preparing a polyester film which comprises melt-extruding a polyester resin to produce a polyester sheet, extending the polyester sheet to shape it into a film and treating the film thermally to heat-set, wherein the polyester resin has an intrinsic viscosity of 0.7 to 0.75 dl/g, the melt-extrusion is carried out using a polyester resin which satisfies-formula (1) and the thermal treatment is carried out so that formula (2) is satisfied:

$$[COOH]/[IV] < 50 \tag{1}$$

$$1.0 < S/D < 1.2 \tag{2}$$

wherein:

[COOH] represents the content (meq/$10^6$) of terminal carboxyl groups in the polyester resin;

[IV] represents the intrinsic viscosity (dl/g) of the polyester resin;

S represents the X-ray crystal size (Å) of the heat-set polyester film; and

D represents the degree of crystallinity (%) of the heat-set polyester film.

2. The process of claim 1 wherein the polyester resin comprises at least 70% by weight of polyethylene terephthalate unit.

3. The process of claim 2 wherein the melt-extrusion is conducted at a temperature ranging from Tm+20° C. to Tm+40° C. where Tm represents the melting point of the polyester resin.

4. The process of claim 2 wherein the thermal treatment is carried out at a temperature range of Tm-80° C. to Tm-20° C., during which the film is subjected to a relaxation treatment by partially releasing the tensional stress applied to the film when the temperature reaches Tm-60° C.

5. The process of claim 1 wherein the polyester resin for the melt-extrusion is prepared by solid phase polymerization of a polyester polymer composite having an intrinsic viscosity of 0.5 to 0.6 dl/g and 70% by weight of ethylene terephthalate unit, so that the resultant polyester resin satisfies formula (3):

$$2.9 < [IV] \times 10/PDI < 3.2 \tag{3}$$

wherein:

[IV] represents the intrinsic viscosity of the polyester resin obtained; and

PDI represents the molecular weight distribution, calculated as the ratio of the weight average molecular weight to the number average molecular weight of the polyester resin (Mw/Mn).

\* \* \* \* \*